US010742596B2

(12) United States Patent
Mosko

(10) Patent No.: US 10,742,596 B2
(45) Date of Patent: Aug. 11, 2020

(54) METHOD AND SYSTEM FOR REDUCING A COLLISION PROBABILITY OF HASH-BASED NAMES USING A PUBLISHER IDENTIFIER

(71) Applicant: CISCO TECHNOLOGY, INC., San Jose, CA (US)

(72) Inventor: Marc E. Mosko, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 530 days.

(21) Appl. No.: 15/061,947

(22) Filed: Mar. 4, 2016

(65) Prior Publication Data

US 2017/0257342 A1 Sep. 7, 2017

(51) Int. Cl.
*H04L 29/12* (2006.01)
*H04L 12/743* (2013.01)
(Continued)

(52) U.S. Cl.
CPC ........ *H04L 61/2046* (2013.01); *G06F 15/167* (2013.01); *H04L 45/7453* (2013.01);
(Continued)

(58) Field of Classification Search
CPC ............. H04L 61/2046; H04L 45/7453; H04L 61/1582; H04L 67/06; H04L 67/327; H04L 45/306; H04L 67/2842; G06F 15/167
(Continued)

(56) References Cited

U.S. PATENT DOCUMENTS 817,441 A 4/1906 Niesz
4,309,569 A 1/1982 Merkle
(Continued)

FOREIGN PATENT DOCUMENTS

CN 103873371 6/2014
DE 1720277 A1 6/1967
(Continued)

OTHER PUBLICATIONS

M. Mosko, CCNx Semantics, Jan. 9, 2015, IRTF ICN Research Group (Year: 2015).*

(Continued)

*Primary Examiner* — Tonia L Dollinger
*Assistant Examiner* — Schquita D Goodwin

(57) ABSTRACT

A replica service of a Content Centric Network can host content published by various publishers, without having to explicitly advertise a name prefix associated with these various publishers. Consumers across CCN can generate an Interest that includes a location-independent name associated with a replica service that hosts content for a given publisher, and includes a hash of the desired Content Object. CCN nodes can forward the Interest to the corresponding replica service based on the Interest's name, and the replica service can return a nameless Content Object whose hash matches the Interest's hash value. It may be possible for nameless Content Objects from various publishers to have matching hash values from time to time. CCN nodes can reduce collisions of nameless Content Objects by using a Publisher ID specified in an Interest to find a matching Content Object that was published by a desired publisher.

20 Claims, 6 Drawing Sheets

(51) Int. Cl.
*H04L 29/08* (2006.01)
*G06F 15/167* (2006.01)
(52) U.S. Cl.
CPC .......... *H04L 61/1582* (2013.01); *H04L 67/06* (2013.01); *H04L 67/327* (2013.01)
(58) Field of Classification Search
USPC ........................................................ 709/216
See application file for complete search history.

(56) References Cited

U.S. PATENT DOCUMENTS

| | | | |
|---|---|---|---|
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |
| 5,649,109 | A | 7/1997 | Griesmer |
| 5,845,207 | A | 12/1998 | Amin |
| 5,870,605 | A | 2/1999 | Bracho |
| 6,021,464 | A | 2/2000 | Yao |
| 6,047,331 | A | 4/2000 | Medard |
| 6,052,683 | A | 4/2000 | Irwin |
| 6,085,320 | A | 7/2000 | Kaliski, Jr. |
| 6,091,724 | A | 7/2000 | Chandra |
| 6,128,623 | A | 10/2000 | Mattis |
| 6,128,627 | A | 10/2000 | Mattis |
| 6,173,364 | B1 | 1/2001 | Zenchelsky |
| 6,182,133 | B1 | 1/2001 | Horvitz |
| 6,209,003 | B1 | 3/2001 | Mattis |
| 6,226,618 | B1 | 5/2001 | Downs |
| 6,233,617 | B1 | 5/2001 | Rothwein |
| 6,233,646 | B1 | 5/2001 | Hahm |
| 6,289,358 | B1 | 9/2001 | Mattis |
| 6,292,880 | B1 | 9/2001 | Mattis |
| 6,332,158 | B1 | 12/2001 | Risley |
| 6,363,067 | B1 | 3/2002 | Chung |
| 6,366,947 | B1 | 4/2002 | Kavner |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,732,273 | B1 | 5/2004 | Byers |
| 6,769,066 | B1 | 7/2004 | Botros |
| 6,772,333 | B1 | 8/2004 | Brendel |
| 6,775,258 | B1 | 8/2004 | vanValkenburg |
| 6,834,272 | B1 | 12/2004 | Naor |
| 6,862,280 | B1 | 3/2005 | Bertagna |
| 6,901,452 | B1 | 5/2005 | Bertagna |
| 6,915,307 | B1 | 7/2005 | Mattis |
| 6,917,985 | B2 | 7/2005 | Madruga |
| 6,957,228 | B1 | 10/2005 | Graser |
| 6,968,393 | B1 | 11/2005 | Chen |
| 6,981,029 | B1 | 12/2005 | Menditto |
| 7,007,024 | B2 | 2/2006 | Zelenka |
| 7,013,389 | B1 | 3/2006 | Srivastava |
| 7,031,308 | B2 | 4/2006 | Garcia-Luna-Aceves |
| 7,043,637 | B2 | 5/2006 | Bolosky |
| 7,061,877 | B1 | 6/2006 | Gummalla |
| 7,080,073 | B1 | 7/2006 | Jiang |
| RE39,360 | E | 10/2006 | Aziz |
| 7,149,750 | B2 | 12/2006 | Chadwick |
| 7,152,094 | B1 | 12/2006 | Jannu |
| 7,177,646 | B2 | 2/2007 | ONeill |
| 7,206,860 | B2 | 4/2007 | Murakami |
| 7,206,861 | B1 | 4/2007 | Callon |
| 7,210,326 | B2 | 5/2007 | Kawamoto |
| 7,233,948 | B1 | 6/2007 | Shamoon |
| 7,246,159 | B2 | 7/2007 | Aggarwal |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,362,727 | B1 | 4/2008 | ONeill |
| 7,382,787 | B1 | 6/2008 | Barnes |
| 7,395,507 | B2 | 7/2008 | Robarts |
| 7,426,696 | B1 | 9/2008 | Hwang |
| 7,430,755 | B1 | 9/2008 | Hughes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,535,926 | B1 | 5/2009 | Deshpande |
| 7,542,471 | B2 | 6/2009 | Samuels |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,564,812 | B1 | 7/2009 | Elliott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,636,767 | B2 | 12/2009 | Lev-Ran |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,698,559 | B1 | 4/2010 | Chaudhury |
| 7,711,684 | B2 | 5/2010 | Sundaresan |
| 7,747,749 | B1 | 6/2010 | Erickson et al. |
| 7,769,887 | B1 | 8/2010 | Bhattacharyya |
| 7,779,467 | B2 | 8/2010 | Choi |
| 7,801,069 | B2 | 9/2010 | Cheung |
| 7,801,177 | B2 | 9/2010 | Luss |
| 7,814,425 | B1 | 10/2010 | O'Shaugnessy |
| 7,816,441 | B2 | 10/2010 | Elizalde |
| 7,831,733 | B2 | 11/2010 | Sultan |
| 7,873,619 | B1 | 1/2011 | Faibish |
| 7,908,337 | B2 | 3/2011 | Garcia-Luna-Aceves |
| 7,924,837 | B1 | 4/2011 | Shabtay |
| 7,953,014 | B2 | 5/2011 | Toda |
| 7,953,885 | B1 | 5/2011 | Devireddy |
| 7,979,912 | B1 | 7/2011 | Roka |
| 8,000,267 | B2 | 8/2011 | Solis |
| 8,010,691 | B2 | 8/2011 | Kollmansberger |
| 8,069,023 | B1 | 11/2011 | Frailong |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,239,331 | B2 | 8/2012 | Shanmugavelayutham |
| 8,271,578 | B2 | 9/2012 | Sheffi |
| 8,271,687 | B2 | 9/2012 | Turner |
| 8,312,064 | B1 | 11/2012 | Gauvin |
| 8,332,357 | B1 | 12/2012 | Chung |
| 8,375,420 | B2 | 2/2013 | Farrell |
| 8,386,622 | B2 | 2/2013 | Jacobson |
| 8,447,851 | B1 | 5/2013 | Anderson |
| 8,462,781 | B2 | 6/2013 | McGhee |
| 8,467,297 | B2 | 6/2013 | Liu |
| 8,473,633 | B2 | 6/2013 | Eardley |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,677,451 | B1 | 3/2014 | Bhimaraju |
| 8,688,619 | B1 | 4/2014 | Ezick |
| 8,688,727 | B1 | 4/2014 | Das |
| 8,699,350 | B1 | 4/2014 | Kumar |
| 8,718,055 | B2 | 5/2014 | Vasseur |
| 8,750,820 | B2 | 6/2014 | Allan |
| 8,761,022 | B2 | 6/2014 | Chiabaut |

(56) References Cited

U.S. PATENT DOCUMENTS

| | | |
|---|---|---|
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,863,227 B2 | 10/2014 | Zhang |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,009,465 B2 | 4/2015 | Zhang |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,268,813 B2 * | 2/2016 | Kim ........................ H04L 67/06 |
| 9,270,598 B1 | 2/2016 | Oran |
| 9,280,610 B2 | 3/2016 | Gruber |
| 9,380,326 B1 | 6/2016 | Corley |
| 9,400,852 B2 | 7/2016 | Kim |
| 9,679,305 B1 * | 6/2017 | Bhat ....................... G06Q 30/06 |
| 2001/0051927 A1 | 12/2001 | London |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0049541 A1 | 3/2004 | Swahn |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0248078 A1 | 11/2006 | Gross |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082509 A1 | 4/2008 | Bessieres |
| 2008/0086755 A1 * | 4/2008 | Darnell ............... H04N 5/44543 |
| | | 725/105 |
| 2008/0095159 A1 | 4/2008 | Suzuki |
| 2008/0101357 A1 | 5/2008 | Lovanna |
| 2008/0107034 A1 | 5/2008 | Jetcheva |
| 2008/0107259 A1 | 5/2008 | Satou |

(56) References Cited

U.S. PATENT DOCUMENTS

| | | |
|---|---|---|
| 2008/0123536 A1 | 5/2008 | Johnson |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0244460 A1 | 10/2008 | Louch |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Lovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |

(56) References Cited

U.S. PATENT DOCUMENTS

| | | |
|---|---|---|
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158912 A1 | 6/2012 | Jacobson |
| 2012/0158973 A1 | 6/2012 | Jacobson |
| 2012/0163373 A1 | 6/2012 | Lo |
| 2012/0166433 A1 | 6/2012 | Tseng |
| 2012/0166806 A1 | 6/2012 | Zhang |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0237028 A1 | 9/2012 | Khazan |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0016695 A1 | 1/2013 | Ravindran |
| 2013/0024560 A1 | 1/2013 | Vasseur |
| 2013/0039249 A1 | 2/2013 | Ravindran |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110781 A1 | 5/2013 | Golab |
| 2013/0110987 A1 | 5/2013 | Kim |
| 2013/0111063 A1 | 5/2013 | Lee |
| 2013/0121489 A1 | 5/2013 | Pestoni |
| 2013/0128786 A1 | 5/2013 | Sultan |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0163758 A1 | 6/2013 | Viswanathan |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0258878 A1 | 10/2013 | Wakikawa |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0322451 A1* | 12/2013 | Wang .................... H04L 45/306 370/392 |
| 2013/0325888 A1 | 12/2013 | Oneppo |
| 2013/0329696 A1 | 12/2013 | Xu |
| 2013/0332955 A1 | 12/2013 | Hong |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2013/0346877 A1 | 12/2013 | Borovoy |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0023076 A1 | 1/2014 | Calo |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0090761 A1 | 4/2014 | Foucher |
| 2014/0096249 A1 | 4/2014 | Dupont |
| 2014/0096269 A1 | 4/2014 | Amidei |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129690 A1 | 5/2014 | Jaisinghani |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0181226 A1* | 6/2014 | Xu .................... H04L 51/14 709/206 |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |

(56) References Cited

U.S. PATENT DOCUMENTS

| | | |
|---|---|---|
| 2014/0281505 A1 | 9/2014 | Zhang |
| 2014/0282816 A1 | 9/2014 | Xie |
| 2014/0289325 A1* | 9/2014 | Solis .............. H04L 67/327 709/204 |
| 2014/0289790 A1 | 9/2014 | Wilson |
| 2014/0298248 A1 | 10/2014 | Kang |
| 2014/0304357 A1* | 10/2014 | Bestler .............. G06F 17/30 709/213 |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0036535 A1 | 2/2015 | Mosko |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0117253 A1 | 4/2015 | Scott |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222424 A1 | 8/2015 | Mosko |
| 2015/0270957 A1 | 9/2015 | Uzun |
| 2015/0279348 A1 | 10/2015 | Cao |
| 2015/0281071 A1 | 10/2015 | Mosko |
| 2015/0288755 A1 | 10/2015 | Mosko |
| 2015/0312300 A1 | 10/2015 | Mosko |
| 2015/0349961 A1 | 12/2015 | Mosko |
| 2015/0350078 A1* | 12/2015 | Azgin .............. H04L 45/306 370/392 |
| 2015/0372903 A1 | 12/2015 | Hui |
| 2015/0381546 A1 | 12/2015 | Mahadevan |
| 2015/0381557 A1* | 12/2015 | Fan .............. H04L 61/10 709/245 |
| 2016/0014027 A1 | 1/2016 | Oran |
| 2016/0019275 A1* | 1/2016 | Mosko .............. G06F 16/27 707/610 |
| 2016/0021172 A1 | 1/2016 | Mahadevan |
| 2016/0062840 A1 | 3/2016 | Scott |
| 2016/0110466 A1 | 4/2016 | Uzun |
| 2016/0149913 A1 | 5/2016 | Eriksson |
| 2016/0171184 A1 | 6/2016 | Solis |
| 2016/0173604 A1 | 6/2016 | Panigrahi |
| 2016/0182475 A1* | 6/2016 | Uzun .............. H04L 63/062 713/171 |
| 2017/0104681 A1* | 4/2017 | Azgin .............. H04L 45/7453 |
| 2018/0075149 A1* | 3/2018 | Trossen .............. H04L 45/306 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2552083 | 1/2013 |
| EP | 2562978 | 10/2014 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2011159715 | 12/2011 |
| WO | 2012077073 A1 | 6/2012 |
| WO | 2013123410 | 8/2013 |
| WO | 2014023072 | 2/2014 |
| WO | 2014090761 | 6/2014 |
| WO | 2014102371 | 7/2014 |

OTHER PUBLICATIONS

M. Mosko, CCNx Messages in TLV Format, Jan. 9, 2015, IRTF ICN Research Group (Year: 2015).*

Van Jacobson, Networking Named Content, Dec. 1, 2009, Palo Alto Research Center (Year: 2009).*

Mark Mosko, CCNx Semantics draft-mosko-icnrg-ccnxsemantics-00, Jan. 9, 2015 (Year: 2015).*

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.

(56) References Cited

OTHER PUBLICATIONS

Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
J.J. Garcia-Luna-Aceves "Name-Based Content Routing in Information Centric Networks Using Distance Information", Proceedings of the 1st International Conference on Information-Centric Networking, INC '14, Sep. 24, 2014, pp. 7-16, *p. 10, left-hand column, first paragraph*.
Lan Wang et al.: "OSPFN: An OSPF Based Routing Protocol for Named Data Networking", Jul. 25, 2012, URL: http://new.named-data.net/wp-content/uploads/TROSPFN.pdf [Retreived on Jul. 25, 2012], *section 3.1; p. 4*.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
Detti et al., "Supporting the Web with an information centric network that routes by name", Aug. 2012, Computer Networks 56, pp. 3705-3702.
Garcia-Luna-Aceves et al., "Automatic Routing Using Multiple Prefix Labels", 2012, IEEE, Ad Hoc and Sensor Networking Symposium.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
L. Wang et al., 'OSPFN: An OSPF Based Routing Protocol for Named Data Networking,' Technical Report NDN-0003, 2012.
Merindol et al., "An efficient algorithm to enable path diversity in link state routing networks", Jan. 10, Computer Networks 55 (2011), pp. 1132-1140.
Soh et al., "Efficient Prefix Updates for IP Router Using Lexicographic Ordering and Updateable Address Set", Jan. 2008, IEEE Transactions on Computers, vol. 57, No. 1.
V. Jacobson et al., 'Networking Named Content,' Proc. IEEE CoNEXT '09, Dec. 2009.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc. downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
Hoque et al., "NLSR: Named-data Link State Routing Protocol", Aug. 12, 2013, ICN'13.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Sciencevol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.

(56) References Cited

OTHER PUBLICATIONS

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

B. Ahlgren et al.,'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

(56) References Cited

OTHER PUBLICATIONS

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNl-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.

(56) References Cited

OTHER PUBLICATIONS

Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., 'NLSR: Named-data Link State Routing Protocol', Aug. 12, 2013, ICN 2013, pp. 15-20.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
International Search Report and Written Opinion in corresponding International Application No. PCT/US2017/020481, dated Apr. 21, 2017, 10 pgs.
Ghali, et al., "Interest-Based Access Control for Content Centric Networks", Proceedings of the 2nd International Conference on Information-Centric Networking, May 23, 2015, 11 pgs.

\* cited by examiner

METHOD AND SYSTEM FOR REDUCING A COLLISION PROBABILITY OF HASH-BASED NAMES USING A PUBLISHER IDENTIFIER

RELATED APPLICATION

The subject matter of this application is related to the subject matter in:
U.S. application Ser. No. 14/337,026, entitled "SYSTEM FOR DISTRIBUTING NAMELESS OBJECTS USING SELF-CERTIFYING NAMES," by inventor Marc E. Mosko, filed 21 Jul. 2014;
U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008; and
U.S. patent application Ser. No. 13/847,814, entitled "ORDERED-ELEMENT NAMING FOR NAME-BASED PACKET FORWARDING," by inventor Ignacio Solis, filed 20 Mar. 2013,
the disclosures of which are incorporated herein by reference in its entirety for all purposes.

BACKGROUND

Field

This disclosure is generally related to computer networking. More specifically, this disclosure is related to using a Publisher Identifier to reduce a collision probability when matching a nameless Content Object to an Interest in a Content Centric Network (CCN).

Related Art

The proliferation of the Internet and e-commerce continues to fuel revolutionary changes in the network industry. Today, a significant number of information exchanges, from online movie streaming to daily news delivery, retail sales, and instant messaging, are conducted online. An increasing number of Internet applications are also becoming mobile. However, the current Internet operates on a largely location-based addressing scheme. The most ubiquitous protocol, the Internet Protocol (IP), is based on location-based address. That is, a consumer of content can only receive the content by explicitly requesting the content from an address (e.g., IP address) closely associated with a physical object or location. A request that has a URL with an IP address for a specific organization causes the request to go to that organization's servers and not to those of another organization.

Content centric networking (CCN) architectures have been proposed in the industry to provide a new approach to content transport. With content centric networks, an Interest message includes a name for a piece of digital content (a Content Object), and a client can disseminate the Interest over CCN to obtain the Content Object from any CCN node that hosts the Content Object. The Interest is forwarded toward a CCN node that advertises at least a prefix of the Interest's name. If this CCN node can provide the Content Object, this node can return the Content Object (along the Interest's reverse path) to satisfy the Interest.

Publishers oftentimes want to replicate their content across various host servers. Doing so in CCN oftentimes requires these host servers to advertise the content's name or name prefix so that CCN routers can know how to forward Interests for this content toward the third-party servers. Unfortunately, if a host server stores Content Objects for a large number of publishers, the host server's neighboring nodes may need to update their forwarding tables to include entries for each name prefix associated with the Content Objects stored by the host server. This places a significant burden across CCN routers. To make matter worse, if CCN routers do not implement a large enough forwarding table, it is possible that these CCN routers may not be able to forward Interests to a host server for all Content Objects available from the host server.

SUMMARY

One embodiment provides an improvement to Information Centric Networks (ICNs), such as Content Centric Networks (CCNs), which allow a replica service to host content published by various publishers, without having to explicitly advertise a name prefix associated with these various publishers. Consumers across CCN can generate an Interest that includes a location-independent name associated with a replica service that hosts content for a given publisher, and includes a hash of the desired Content Object. CCN nodes can forward the Interest to the corresponding replica service based on the Interest's name, and the replica service can return a nameless Content Object whose hash matches the Interest's hash value. It may be possible for nameless Content Objects from various publishers to have matching hash values from time to time. CCN nodes can reduce collisions of nameless Content Objects by using a Publisher ID specified in an Interest to find a matching Content Object that was published by a desired publisher.

During operation, a packet-forwarding system can receive an Interest for a Content Object. The Interest may include a location-independent name prefix associated with a content producer that hosts the Content Object, a Content Object Hash value that specifies a hash of the Content Object, and a Publisher ID associated with a publisher of the Content Object. If the Content Object is not stored in a local Content Store, the system can generate an entry for the Content Object in a Pending Interest Table (PIT), such that the PIT entry maps the Content Object Hash value and Publisher ID of the Interest to an interface of the computer from which the Interest was received. Then, in response to receiving a Content Object whose hash value matches the Content Object Hash value in the PIT entry and whose Publisher ID matches the Publisher ID of the PIT entry, the system can forward the received Content Object via the interface specified in the PIT entry.

In information centric networks (ICN), each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the packet-forwarding system can receive the Interest over a CCN computer network.

In some embodiments, the packet-forwarding system can receive the Interest from an application being executed by the local computer.

In some embodiments, the system can perform a lookup operation in a cache repository using the Content Object Hash value and Publisher ID. If the system identifies, from the cache repository, a Content Object whose hash value matches the Interest's Content Object Hash value and whose Publisher ID matches the Interest's Publisher ID, the system may return the identified Content Object to satisfy the Interest.

In some embodiments, the system may receive the Content Object over a computer network, and determines whether the Content Object includes a name. If the Content Object does not include a name, the system can compute a hash value of the Content Object, and performs a lookup operation in the PIT using the computed hash value to search for a PIT entry that includes a matching Content Object Hash value, and includes a matching Publisher ID.

In some variations on this embodiment, if the system determines that the Content Object does include a name, the system can perform a lookup operation in the PIT using the Content Object's name to search for a PIT entry that includes a name that matches at least a prefix of the Content Object's name.

BRIEF DESCRIPTION OF THE FIGURES

In the figures, like reference numerals refer to the same figure elements.

DETAILED DESCRIPTION

Figure 1:
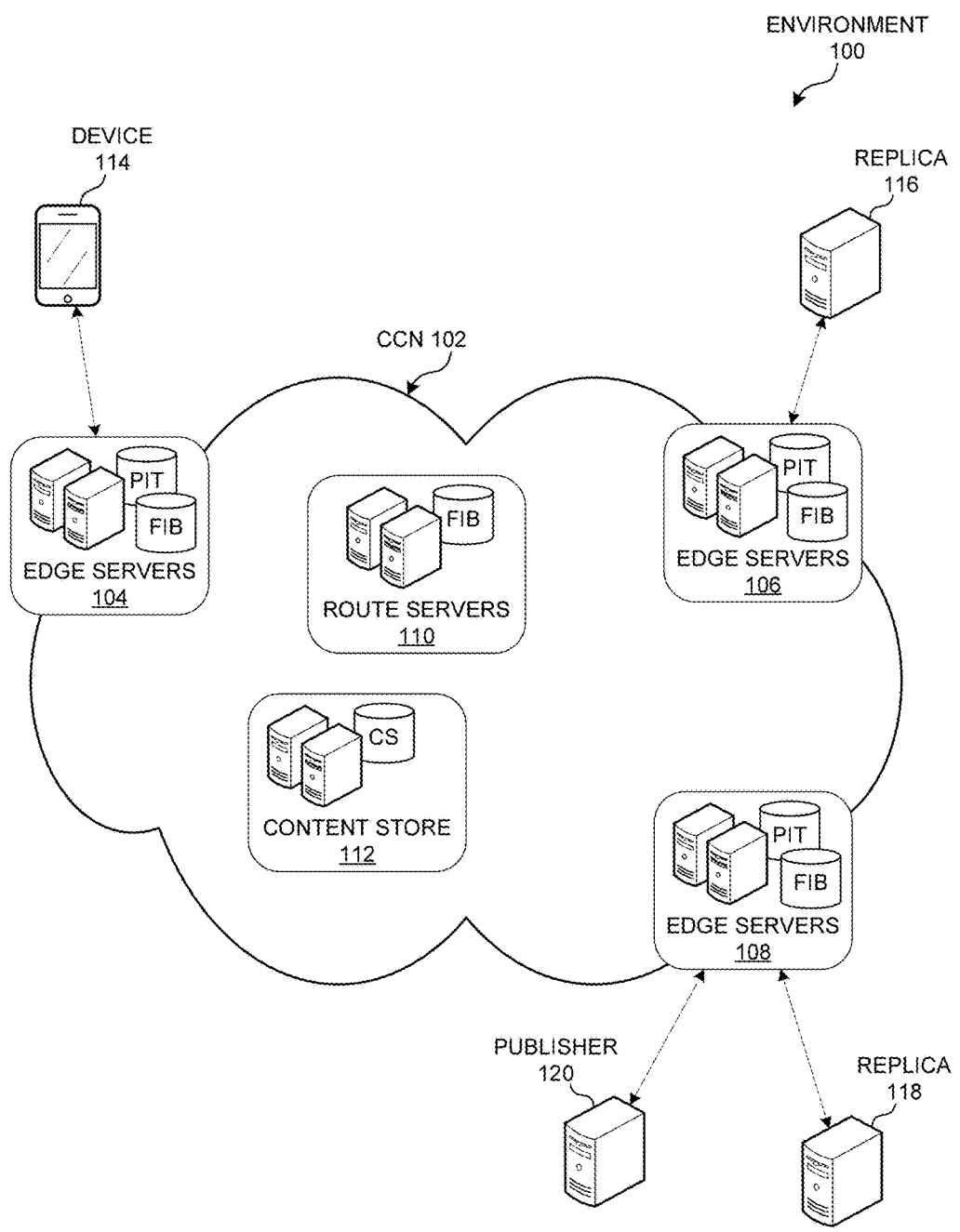
FIG. 1 illustrates a computing environment that facilitates forwarding nameless Content Objects over a Content Centric Network (CCN) in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a packet-forwarding system that solves the problem of reducing the possibility of collisions of nameless Content Objects by using a Publisher ID that can be used to match a relevant nameless Content Object to an Interest. For example, in some embodiments of a Content Centric Network (CCN), it is possible for a Content Object to be generated without a name. These Content Objects are oftentimes referred to as "nameless objects" that can be identified by their hash value and optionally with a Publisher ID value. For nameless Content Objects, an Interest can include a name or name prefix that can be used as a "locator" that CCN nodes can use to forward the Interest toward a content producer, a replica server, or a cache (e.g., a CCN Data Store) that may provide the requested Content Object that has a matching hash value.

In some embodiments, the Publisher ID can reduce the possibility of Content Object collision between different publishers, without adding a name to the nameless Content Object. Hence, CCN nodes can use the Publisher ID to match the nameless Content Object to an Interest, but may not use the Publisher ID to route the Interest toward a hosting service that hosts the Content Object.

If a CCN node that receives the Interest has a repository of Content Objects, this CCN node can compare the hash values of the Content Objects in the repository to search for a matching object, without having to compare Content Object names to the Interest's name. If the CCN node cannot identify a stored Content Object with a matching hash value, the CCN node can forward the Interest, using the Interest's name (or a prefix of the Interest's name) to search a forwarding table for an interface to use. However, if a Content Object with a hash value matching the Interest's COH value is found, the CCN node can return this matching object to satisfy the Interest if the Interest and Content Object have matching Publisher ID values.

A Content Object Hash that is 32 bytes long can have a substantially low collision probability (e.g., 10^-40). However, this low collision probability can still result in periodic collisions between two Content Objects with different payloads, as the number of published Content Objects increases across a world-wide Content Centric Network. Hence, by generating a Content Object to include a publisher's identifier (the Publisher ID), Content Object collisions may only occur within the scope of Content Objects associated with one publisher. The Content Object Hash (COH) values become scoped to the publisher (e.g., to the Publisher ID). Then, when a content consumer disseminates an Interest over CCN, the CCN nodes may forward the Interest using the Interest's name, until the Interest reaches a node that stores a Content Object whose hash matches the Interest's COH, and whose Publisher ID matches the Interest's Publisher ID.

Note that the Publisher ID allows controlling the scope of a Content Object differently than a Key ID. Typical Interests (e.g., Interests for named objects) can include a name, an optional Key ID, and an optional Content Object Hash (COH) restriction. When the Interest is matched to a Content Object, their names and Key ID need to match, and the COH is computed from the Content Object's name and payload and compared to the COH value in the Interest.

However, the Key ID corresponds to a key used to sign a named Content Object, where the Key ID may or may not correspond to the publisher of the data in the Content Object. For example, if the named Content Object is moved to a different replica service (whose servers may be distributed across various geographic and network locations), it is likely the named Content Object may need to obtain a new name derived from the replica service's name prefix. This produces a new Content Object with a new name. Moreover, this new name requires the replica service to compute a new hash value for the new named Content Object, to generate a new signature for the new named Content Object based on the new hash value, and to assign its own Key ID to the new named Content Object.

On the other hand, if a publisher publishes content using nameless Content Objects, the publisher can assign its own Publisher ID to the nameless Content Object, and can upload the same nameless Content Object to various replica services. The publisher may not need to generate a different nameless Content Object for each different replica service, and the same Publisher ID can provide scoping that reduces collisions across the various replica services.

In prior versions of CCN, a KeyId is only included in a Content Object if the Content Object also includes a corresponding signature. This is because actual KeyIDs are typically used to validate a signature, and may not serve a purpose when a corresponding signature is not provided.

Hence, in some embodiments, given that the KeyID and signatures are optional fields for Content Objects, the KeyId field in a Content Object can be used to hold a Publisher ID (or any identifier that functions as the PublisherId), if the Content Object does not carry a corresponding signature. The Key Id field can be used to inject a known byte string into a Content Object without having to include an explicit Publisher ID field, which provides additional scoping that can reduce collisions as if an explicit Publisher Id was included and enforced.

Exemplary Computing Environment

FIG. 1 illustrates a computing environment 100 that facilitates forwarding nameless Content Objects over a Content Centric Network (CCN) 102 in accordance with an embodiment. In some embodiments, the nameless Content Objects are truly placeless objects, as they do not include a name, and thus don't have an implied routing. A publisher 120 can host these nameless Content Objects across various replica services (hosts), even when their servers advertise only their own name prefix to other CCN nodes. For example, a replica service may host content on replica server 116 and replica server 118. The publisher 120 can upload the nameless Content Objects to a replica server 116 (accessible via edge servers 106 of CCN 102), as well as to a replica server 118 (accessible via edge servers 108 of CCN 102). The publisher 120 can create a Manifest for a nameless Content Object (or a hierarchy of Manifests for a collection of nameless Content Objects), and can provide the Manifest (or a root Manifest) to a client device 114. Device 114 can generate Interests to request the nameless Content Objects directly from any server of the replica service. The Manifest (or root Manifest) can include name prefixes for one or more replica services, can include a Publisher ID associated with the publisher 120, and can include Content Object hash (COH) values that can be used to uniquely identify nameless Content Objects or other non-root Manifests.

Device 114 can generate an Interest for a nameless Content Object using information from the Manifest, and can disseminate the Interest over CCN 102. For example, device 114 can generate the Interest to include (from the Manifest) a name prefix for the replica service, the Publisher ID, and the COH value for the nameless Content Object.

In some embodiments, CCN 102 can include a set of forwarding nodes and/or caching nodes. For example, edge servers 104, 106, and 108 can correspond to gateway nodes of an autonomous system (e.g., Internet service provider), route servers 110 can forward Interests and Content Objects within the autonomous system. These forwarding nodes can forward an Interest from client device 114 toward a replica server associated with the Interest's name or name prefix, or toward a Content Store 112 that may host a cached copy of the Content Object.

Figure 2:
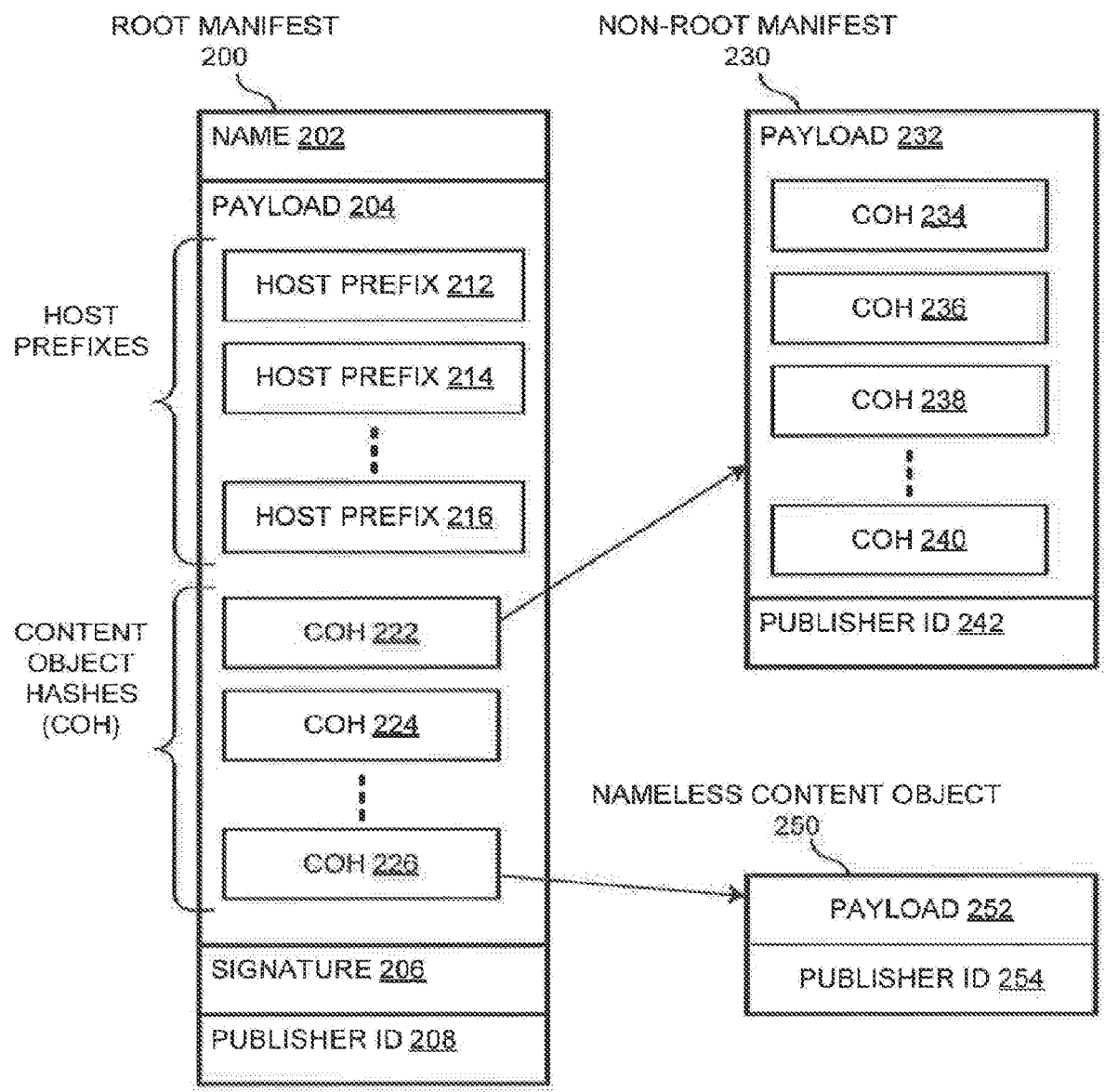
FIG. 2 illustrates exemplary Manifests and an exemplary nameless Content Object in accordance with an embodiment.

FIG. 2 illustrates exemplary Manifests 200 and 230 and an exemplary nameless Content Object 250 in accordance with an embodiment. Specifically, root Manifest 200 can include a name 202, a payload 204, a signature 206, and a Publisher ID 208. Name 202 can include a name (or name prefix) for the collection. If the collection was generated by partitioning a large data object, name 202 can include the name for the data object from which the collection was generated. Also, signature 206 can include a cryptographic signature, generated based on name 202 and payload 204, and signed using the publisher's digital certificate.

Payload 204 of root Manifest 200 can include a set of host prefixes 212-216 that can be used to request the nameless Content Objects in the collection from a content-hosting service, such as a replica server. The content-hosting service can host a collection of Content Objects as well as the nameless non-root Manifests. Payload 204 can also include a set of Content Object hash (COH) values 222-226, which a content-hosting service can use to match against a nameless Content Object's hash value.

In some embodiments, a COH value of root Manifest 200 can correspond to a non-root Manifest 230, or to a nameless Content Object 250. In some embodiments, a computing device may compute a hash of nameless Content Object 250 or Non-Root Manifest 230 from its payload, and not based on a name that can change according to which replica server is hosting the nameless object.

Nameless Content Object 250 can include a payload 252 and a Publisher ID 254. Also, non-root Manifest 230 may be generated as a nameless Content Object which the content-hosting services can store along with the collection's other Content Objects. For example, non-root Manifest 230 can include a payload 232 that can include a set of Content Object hash (COH) values 234-240 and include a Publisher ID 242. Hence, like any nameless Content Object, non-root Manifest 230 does not need to include a name or a signature.

In some embodiments, a content-hosting service can use a COH value of a root Manifest or a non-root Manifest to match against a nameless Content Object's hash value. Similar to root Manifest 200, a COH value of non-root Manifest 230 can also correspond to another non-root Manifest, or to a nameless Content Object.

In some embodiments, a Content Object that is accessible by its COH value may not also include a name, which prevents the nameless Content Object from later being matched by name. This in turn prevents malicious entities from injecting objects with another name or name prefix into a cache. For example, a malicious entity can be associated with, and can receive Interests with a name prefix "/foo." However, if this malicious entity were allowed to satisfy an Interest based on the hash value by returning a Content Object with a different name prefix "/bar," the malicious entity would end up injecting content (e.g., malicious content) into the name prefix "/bar" throughout Content stores across CCN. Once the malicious content has been cached, other content consumers may receive this injected content when they disseminate an Interest that requests the Content Object "/bar" by name (e.g., without requesting the Content Object by its hash value).

Figure 3:
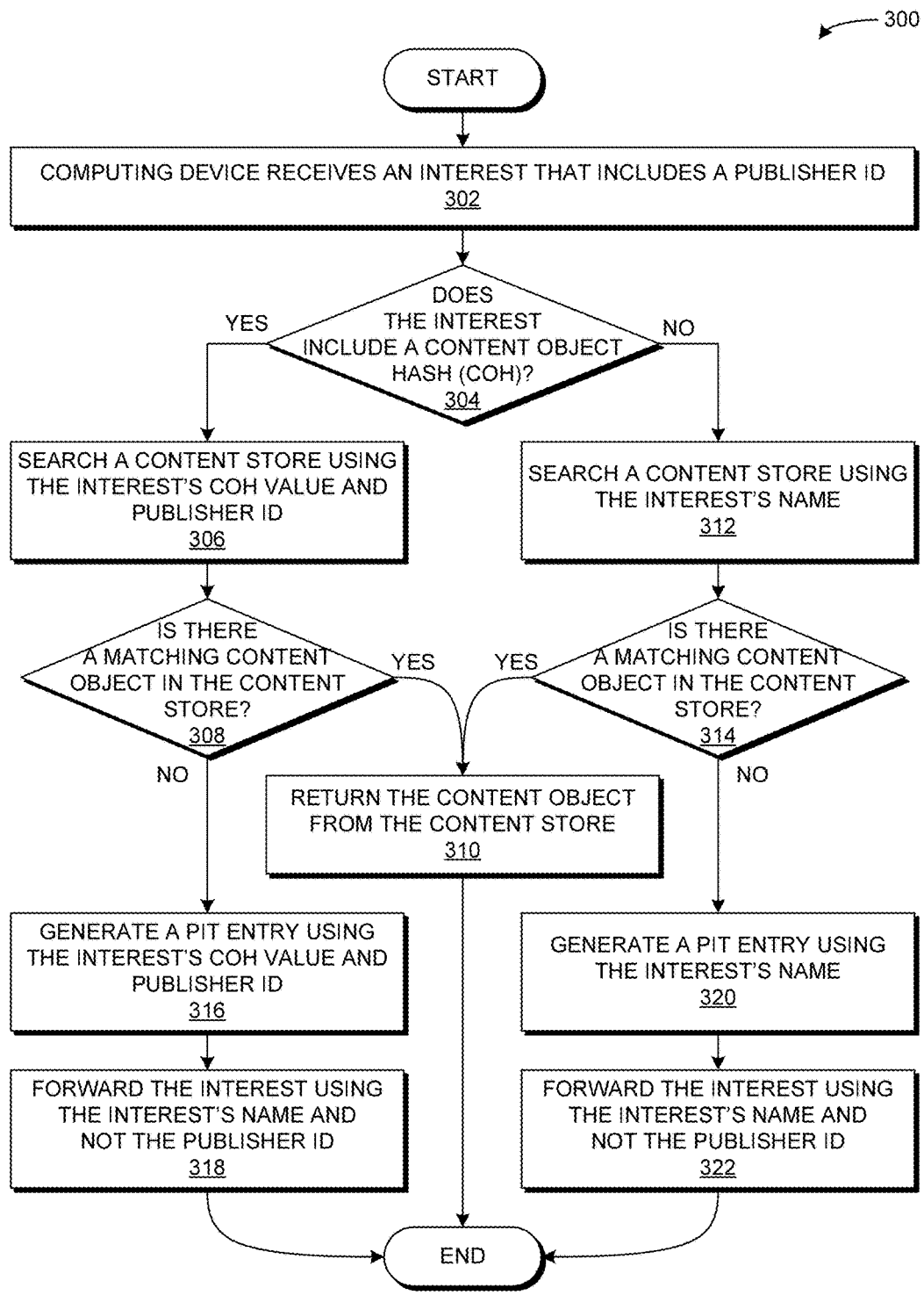
FIG. 3 presents a flow chart illustrating a method for processing Interests that correspond to named or nameless Content Objects in accordance with an embodiment.

FIG. 3 presents a flow chart illustrating a method 300 for processing Interests that correspond to named or nameless Content Objects in accordance with an embodiment. During operation, a computing device can receive an Interest message that includes a location-independent name or name prefix (e.g., an HSVLI) associated with a Content Object (operation 302). In some embodiments, if the Interest corresponds to a nameless Content Object, the Interest may include a Content Object Hash (COH) value of the requested Content Object, and may include a Publisher ID for a publisher that generates or has generated the Content Object.

If the Interest includes a COH value (operation 304), the computing device can process the Interest by searching a Content Store (e.g., a cache) using the COH value and Publisher ID (operation 306). If a matching Content Object is found (operation 308), the computing device can return the cached Content Object (operation 310).

If a matching Content Object doesn't exist in the Content Store (operation 308), the computing device can generate a PIT entry that maps the Interest's location-independent name to an interface from which the Interest was received (operation 316). The computing device can then forward the Interest using the Interest's location-independent name (operation 318), such as by first identifying an interface for the Interest by searching a Forwarding Information Base (FIB) based on the location-independent name, and not based on the Publisher ID.

On the other hand, if the Interest does not include a COH value (operation 304), the computing device can process the Interest as usual. For example, the computing device can search the Content Store using the Interest's location-independent name (operation 312), and if a matching Content Object is found (operation 314), the computing device can return the Content Object (operation 310).

If a Content Object with a name that matches at least a prefix of the Interest doesn't exist in the Content Store, the computing device can generate a PIT entry that maps the Interest's location-independent name to an interface from which the Interest was received (operation 320). The computing device may then forward the Interest using the Interest's name and not a publisher ID (operation 322).

In some embodiments, some operations described above (e.g., operations 306, 316, and 318) may access the Content Store, PIT, and FIB using only the Content Object Hash value, to perform matching operations without scoping a Content Object's hash value, when an Interest does not include a Publisher ID. For example, accessing the Content Store or the FIB using only the Content Object Hash value of an Interest can return an entry that includes a matching hash value and includes any Publisher ID value. Moreover, searching the PIT based on a Content Object's hash value and Publisher ID can return any PIT entry that includes a matching hash value, and whose Publisher ID is either empty (e.g., not scoped) or matches the Content Object's Publisher ID (e.g., is scoped to the Publisher ID).

Figure 4:
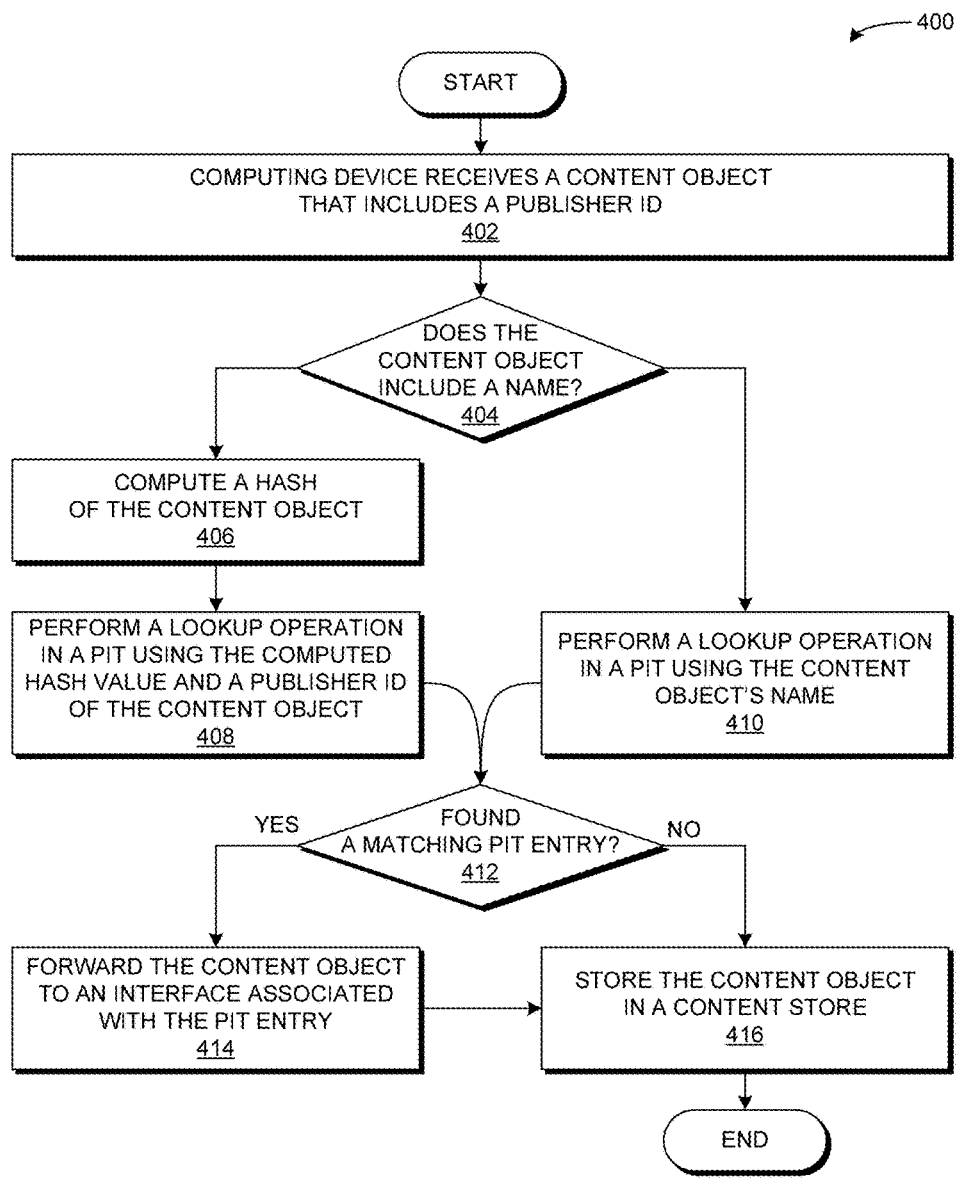
FIG. 4 presents a flow chart illustrating a method for forwarding named or nameless Content Object in accordance with an embodiment.

FIG. 4 presents a flow chart illustrating a method 400 for forwarding named or nameless Content Object in accordance with an embodiment. During operation 402, the computing device can receive a Content Object (operation 402), which may be a named or a nameless object. Recall that if some CCN nodes are allowed to match a Content Object to an Interest by the Content Object's hash, other CCN nodes should not be allowed to match an Interest to this Content Object by name. Hence, the computing device needs to determine how to process the received Content Object based on whether the Content Object is a named object or a nameless object (operation 404).

If the Content Object is a nameless object, the computing device computes a hash of the Content Object (operation 406), and performs a lookup operation in a PIT using the computed hash value and the Content Object's Publisher ID (operation 408). This allows the computing device to compare the nameless Content Object only against Interests that were intended for a nameless object (and not against Interests that were intended for a named object). Recall that a typically Content Object only includes a Key ID along with a matching signature, and so the Key ID field can be used to hold the Publisher ID when a signature is not used. If the Content Object includes an explicit Publisher ID field, the computing device can obtain the Publisher ID value from the explicit Publisher ID field. However, if the Content Object includes a KeyID but does not include a signature, the computing device can obtain the Publisher ID from the Content Object's KeyID field.

However, if the Content Object includes a location-independent name (e.g., the Content Object is not a nameless object), the computing device can perform a lookup operation in a PIT using the Content Object's location-independent name (operation 410). This allows the computing device to compare the named Content Object only against Interests that were intended for a named object (and not against Interests that were intended for a nameless object).

If the computing device finds a matching PIT entry (operation 412), the computing device can forward the Content Object to an interface associated with the PIT entry (operation 414).

In some embodiments, the computing device can also store the Content Object in a Content Store (e.g., in a cache) (operation 416). If the Content Object is a nameless object, the computing device can later compare the nameless Content Object's hash and Publisher ID to the COH and Publisher ID of an incoming Interest. Otherwise, if the Content Object is a named object, the computing device can later compare the Content Object's name or name prefix to that of an incoming Interest.

Figure 5:
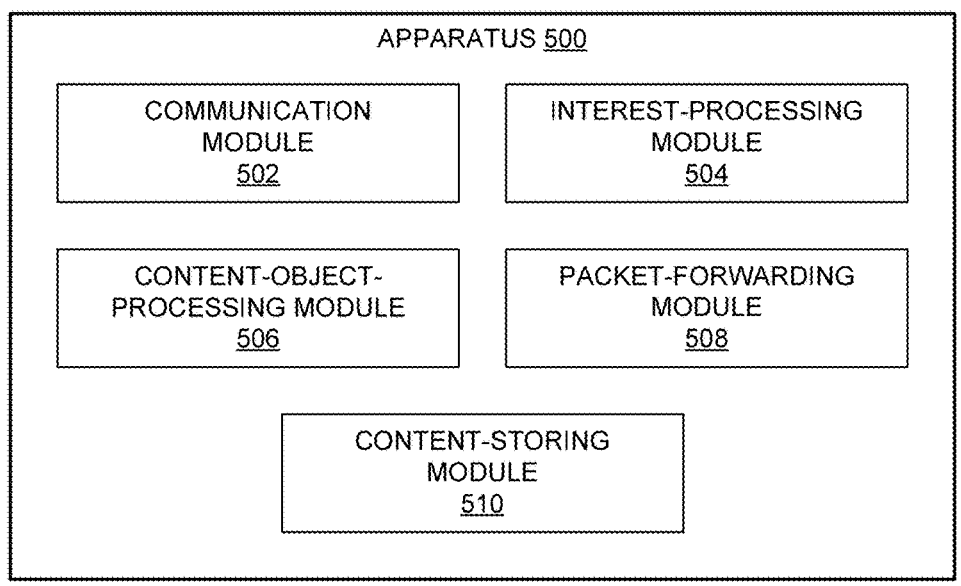
FIG. 5 illustrates an exemplary apparatus that facilitates forwarding nameless Content Objects over CCN in accordance with an embodiment.

FIG. 5 illustrates an exemplary apparatus 500 that facilitates forwarding nameless Content Objects over a Content Centric Network (CCN) in accordance with an embodiment. Apparatus 500 can comprise a plurality of modules which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device which is capable of communicating with other computer systems and/or devices. Specifically, apparatus 500 can comprise a communication module 502, an Interest-processing module 504, a Content-Object processing module 506, a packet-forwarding module 508, and a content-storing module 510.

In some embodiments, communication module 502 can receive an Interest for a Content Object over a Content Centric Network. The Interest can include a location-independent name prefix associated with a hosting service for the Content Object, a Content Object Hash value that specifies a hash of the Content Object, and a Publisher ID associated with a publisher of the Content Object.

Interest-processing module 504 can generate an entry for the Content Object in a Pending Interest Table (PIT), such that the PIT entry maps the Content Object Hash value and Publisher ID of the Interest to an interface of the computer from which the Interest was received. Packet-forwarding module 508 can forward the Interest toward an interface associated with the Interest's name or name prefix.

In some embodiments, when communication module 502 receives a Content Objet, Content-Object-processing module 506 can determine whether a hash of a received Content Object matches the Content Object Hash value in the PIT entry, and whether the Content Object's Publisher ID matches the Publisher ID of the PIT entry. If a matching Content Object is found, packet-forwarding module 508 can forward the Content Object via an interface associated with the matching Interest (as determined from the PIT entry) to satisfy the Interest.

Content-storing module 510 can cache Content Objects in a cache repository, and can perform a lookup operation in the cache repository using an Interest's Content Object Hash value and Publisher ID.

Figure 6:
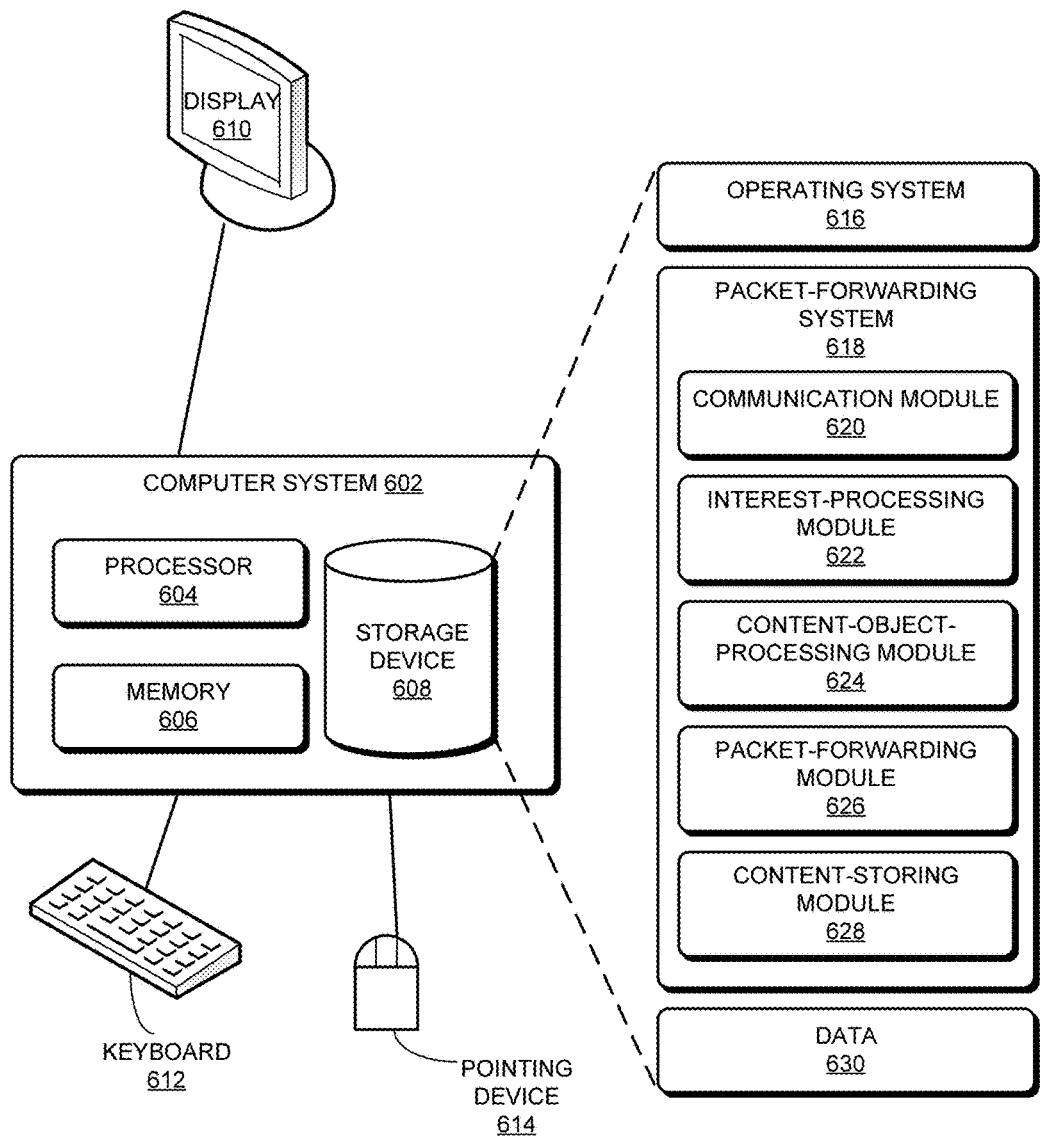
FIG. 6 illustrates an exemplary computer system that facilitates forwarding nameless Content Objects over CCN in accordance with an embodiment.

FIG. 6 illustrates an exemplary computer system 602 that facilitates forwarding nameless Content Objects over a Content Centric Network (CCN) in accordance with an embodiment. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store operating system 616, a packet-forwarding system 618, and data 630.

Packet-forwarding system 618 can include instructions, which when executed by computer system 602, can cause computer system 602 to perform methods and/or processes described in this disclosure. Specifically, packet-forwarding system 618 may include instructions for receiving an Interest for a Content Object over a Content Centric Network (communication module 620). Further, packet-forwarding system 618 can include instructions for generating an entry for the Content Object in a Pending Interest Table (PIT), such that the PIT entry maps the Content Object Hash value and Publisher ID of the Interest to an interface of the computer from which the Interest was received (Interest-processing module 622). Packet-forwarding system 618 can forward the Interest toward an interface associated with the Interest's name or name prefix.

Packet-forwarding system 618 can also include instructions for processing a Content Object received over the Content Centric Network (Content-Object-processing module 624). For example, Content-Object-processing module 624 can determine whether a hash of a received Content Object matches the Content Object Hash value in the PIT entry, and whether the Content Object's Publisher ID matches the Publisher ID of the PIT entry. If a matching Content Object is found, packet-forwarding system 618 can forward the Content Object via an interface associated with the matching Interest (as determined from the PIT entry) to satisfy the Interest.

Packet-forwarding system 618 can include instructions for forwarding Interests based on an Interest's name (and not based on the COH value or the Publisher ID), and for forwarding a Content Object based on its hash and Publisher ID value (packet-forwarding module 626).

Packet-forwarding system 618 can also include instructions for caching Content Objects in a cache repository, and performing a lookup operation in the cache repository using an Interest's Content Object Hash value and Publisher ID (content-storing module 628).

Data 630 can include any data that is required as input or that is generated as output by the methods and/or processes described in this disclosure. Specifically, data 630 can store at least a Forwarding Information Base (FIB), a Pending Interest Table (PIT), and a Content Store (e.g., a Content Object cache).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
    receiving, by a computer in a computer network, an Interest for a Content Object over the computer network or from an application being executed by the computer, wherein the Interest includes a location-independent name prefix related to a content producer that hosts the Content Object, a Content Object hash value that specifies a hash of the Content Object, and a Publisher ID related to a publisher of the Content Object;
    generating an entry for the Content Object in a Pending Interest Table (PIT);
    mapping, in the entry, the Content Object hash value and Publisher ID of the Interest to an interface of the computer from which the Interest was received;
    in response to receiving the Content Object:
        determining that the Content Object does not include a name;
        in response to determining that the Content Object does not include a name, computing a hash value for the Content Object; and
        obtaining a Publisher ID from the Content Object;
    determining whether the computed hash value matches the Content Object hash value in the entry and whether the Publisher ID of the Content Object matches the Publisher ID of the entry to reduce collision of two or more computed hash values; and
    in response to determining that the computed hash value matches the Content Object hash value in the entry and that the Publisher ID of the Content Object matches the Publisher ID of the entry, forwarding the Content Object via the interface specified in the entry to satisfy the Interest.

2. The method of claim 1, further comprising:
    performing a lookup operation in a cache repository using the Content Object hash value and Publisher ID; and
    in response to identifying, from the cache repository, a Content Object whose hash value matches the Interest's Content Object hash value and whose Publisher ID matches the Interest's Publisher ID, returning the identified Content Object to satisfy the Interest.

3. The method of claim 1, further comprising:
    performing a lookup operation in the PIT using the computed hash value to search for an entry that includes a matching Content Object hash value, and includes a matching Publisher ID.

4. The method of claim 1, further comprising:
    receiving the Content Object over the computer network; and
    in response to determining that the Content Object includes a name, performing a lookup operation in the PIT using the Content Object's name to search for an entry that includes a name that matches at least a prefix of the Content Object's name.

5. The method of claim 1, wherein obtaining the Publisher ID from the Content Object involves:
    in response to determining that the Content Object includes a Key ID field and does not include a signature, obtaining the Publisher ID from the Content Object's Key ID field.

6. A non-transitory computer-readable storage medium storing instructions that when executed by a computer in a computer network cause the computer to:
    receive, over the computer network or from an application being executed by the computer, an Interest for a Content Object, wherein the Interest includes a location-independent name prefix related to a content producer that hosts the Content Object, a Content Object hash value that specifies a hash of the Content Object, and a Publisher ID related to a publisher of the Content Object;
    generate an entry for the Content Object in a Pending Interest Table (PIT);
    map, in the entry, the Content Object hash value and Publisher ID of the Interest to an interface of the computer from which the Interest was received;
    in response to receiving the Content Object:
        determine that the Content Object does not include a name;
        in response to determining that the Content Object does not include a name, compute a hash value for the Content Object; and
        obtain a Publisher ID from the Content Object;
    determine whether the computed hash value matches the Content Object hash value in the entry and whether the Publisher ID of the Content Object matches the Publisher ID of the entry to reduce collision of two or more computed hash values; and
    in response to determining that the computed hash value matches the Content Object hash value in the entry and that the Publisher ID of the Content Object matches the Publisher ID of the entry, forward the Content Object via the interface specified in the entry to satisfy the Interest.

7. The non-transitory computer-readable storage medium of claim 6, wherein the instructions cause the computer further to:
    perform a lookup operation in a cache repository using the Content Object hash value and Publisher ID; and
    in response to identifying, from the cache repository, a Content Object whose hash value matches the Interest's Content Object hash value and whose Publisher ID matches the Interest's Publisher ID, return the identified Content Object to satisfy the Interest.

8. The non-transitory computer-readable storage medium of claim 6, wherein the instructions cause the computer further to:
    perform a lookup operation in the PIT using the computed hash value to search for an entry that includes a matching Content Object hash value, and includes a matching Publisher ID.

9. The non-transitory computer-readable storage medium of claim 6, wherein the instructions cause the computer further to:
    receive the Content Object over the computer network; and
    in response to determining that the Content Object includes a name, perform a lookup operation in the PIT using the name of the Content Object to search for an entry that includes a name that matches at least a prefix of the name of the Content Object.

10. The non-transitory computer-readable storage medium of claim 6, wherein the instructions cause the computer to obtain the Publisher ID from the Content Object by:

in response to determining that the Content Object includes a Key ID field and does not include a signature, obtaining the Publisher ID from the Content Object's Key ID field.

11. An apparatus, comprising:

a processor; and a memory configured to store instructions, wherein the processor, when executing the instructions, is configured to:

receive an Interest for a Content Object over a computer network or from an application being executed by the computer, wherein the Interest includes a location-independent name prefix related to a content producer that hosts the Content Object, a Content Object hash value that specifies a hash of the Content Object, and a Publisher ID related to a publisher of the Content Object;

generate an entry for the Content Object in a Pending Interest Table (PIT);

map, in the entry, the Content Object hash value and Publisher ID of the Interest to an interface of the computer from which the Interest was received;

in response to receiving the Content Object:
 determine that the Content Object does not include a name;
 in response to determining that the Content Object does not include a name, compute a hash value for the Content Object; and
 obtain the Publisher ID from the Content Object;

determine whether the computed hash value of the Content Object matches the Content Object hash value in the entry, and whether the Content Object's Publisher ID matches the Publisher ID of the entry to reduce collision of two or more computed hash values; and in response to the computed Content Object's hash value and Publisher ID matching the Content Object hash value and Publisher ID of the entry, forward the Content Object via the interface specified in the entry to satisfy the Interest.

12. The apparatus of claim 11, wherein the processor is further configured to perform a lookup operation in a cache repository using the Content Object hash value and Publisher ID; and in response to identifying a cached Content Object whose hash value matches the Interest's Content Object hash value and whose Publisher ID matches the Interest's Publisher ID, the processor is configured to return the cached Content Object to satisfy the Interest.

13. The apparatus of claim 11, wherein the processor is further configured to:

perform a lookup operation in the PIT using the computed hash value to search for an entry that includes a matching Content Object hash value, and includes a matching Publisher ID.

14. The apparatus of claim 11, wherein the processor is further configured to:

receive the Content Object over the computer network; and in response to determining that the Content Object includes a name, perform a lookup operation in the PIT using the name of the Content Object to search for an entry that includes a name that matches at least a prefix of the name of the Content Object.

15. The method of claim 1, further comprising:

forwarding the Interest based on the location-independent name prefix and not based on the Publisher ID.

16. The method of claim 1, wherein the location-independent name prefix is a hierarchically structured variable-length identifier.

17. The non-transitory computer-readable storage medium of claim 6, wherein the instructions cause the computer further to:

forward the Interest based on the location-independent name prefix and not based on the Publisher ID.

18. The non-transitory computer-readable storage medium of claim 6, wherein the location-independent name prefix is a hierarchically structured variable-length identifier.

19. The apparatus of claim 11, wherein the processor is further configured to:

forward the Interest based on the location-independent name prefix and not based on the Publisher ID.

20. The apparatus of claim 11, wherein the location-independent name prefix is a hierarchically structured variable-length identifier.

* * * * *